(12) United States Patent
Hung et al.

(10) Patent No.: US 8,747,528 B2
(45) Date of Patent: Jun. 10, 2014

(54) ADSORPTION UNIT, ADSORTION DEVICE, AND METHOD FOR REGENERATING THEREOF

(75) Inventors: Ming-Lang Hung, Taipei (TW); Pen-Chang Tseng, Zhudong Township, Hsinchu County (TW); Kang Yu Hao, Taipei (TW); Hsing-Ting Chen, Taipei (TW); Jyi-Ching Perng, Hukou Township (TW)

(73) Assignee: Industrial Technology Research Institute, Hsinchu (TW)

( * ) Notice: Subject to any disclaimer, the term of this patent is extended or adjusted under 35 U.S.C. 154(b) by 187 days.

(21) Appl. No.: 13/445,670

(22) Filed: Apr. 12, 2012

(65) Prior Publication Data

US 2013/0061756 A1 Mar. 14, 2013

(30) Foreign Application Priority Data

Sep. 9, 2011 (TW) .................................. 100132539

(51) Int. Cl.
*B01D 53/04* (2006.01)
*B01D 53/06* (2006.01)

(52) U.S. Cl.
USPC .................................. 96/125; 96/146; 96/154

(58) Field of Classification Search
USPC ........... 95/113, 115, 117, 126, 141, 143, 148; 96/125, 126, 143, 146, 150, 154
See application file for complete search history.

(56) References Cited

U.S. PATENT DOCUMENTS

| | | | | |
|---|---|---|---|---|
| 5,308,457 | A | * | 5/1994 | Dalla Betta et al. ............ 95/143 |
| 5,512,083 | A | * | 4/1996 | Dunne ............................. 95/113 |
| 5,750,026 | A | * | 5/1998 | Gadkaree et al. .......... 210/502.1 |
| 6,083,304 | A | | 7/2000 | Fujimura |
| 6,197,097 | B1 | * | 3/2001 | Ertl et al. ......................... 96/143 |
| 7,172,645 | B1 | * | 2/2007 | Pfister et al. .................... 95/116 |
| 7,416,587 | B2 | * | 8/2008 | Kondo ............................ 96/146 |
| 7,563,306 | B2 | | 7/2009 | Boutall et al. |
| 8,373,283 | B2 | | 2/2013 | Masuko et al. |
| 2010/0175557 | A1 | | 7/2010 | Shih et al. |

FOREIGN PATENT DOCUMENTS

| | | |
|---|---|---|
| JP | S61-187919 A | 8/1986 |
| JP | H03-12213 A | 1/1991 |
| JP | 2001179037 (A) | 7/2001 |
| TW | I255330 (B) | 5/2006 |
| TW | M306314 (U) | 2/2007 |
| TW | M321979 (U) | 11/2007 |
| TW | M333951 U | 6/2008 |
| TW | M348921 (U) | 1/2009 |
| TW | 200940919 A | 10/2009 |

(Continued)

OTHER PUBLICATIONS

Japanese Office Action for Japanese Application No. 2012-155228 dated Aug. 20, 2013.

(Continued)

*Primary Examiner* — Frank Lawrence
(74) *Attorney, Agent, or Firm* — Muncy, Geissler, Olds & Lowe, P.C.

(57) ABSTRACT

An adsorption unit is provided, including an electrical heating substrate defined with a fluid channel therein, and an adsorptive material layer formed on the electrical heating substrate to contact the fluid channel for adsorbing moisture or volatile organic compounds (VOCs) in a gas flow through the fluid channel.

13 Claims, 14 Drawing Sheets

(56) References Cited

FOREIGN PATENT DOCUMENTS

| TW | 201006901 A | 2/2010 |
|---|---|---|
| TW | 201022605 (A) | 6/2010 |
| TW | 201026374 (A) | 7/2010 |
| TW | I329528 B | 9/2010 |
| TW | M388974 U1 | 9/2010 |
| TW | 201037239 (A) | 10/2010 |
| WO | WO 2004/080497 A1 | 9/2004 |

OTHER PUBLICATIONS

T.S. Ge et al., A review of the mathematical models for predicting rotary desiccant wheel, Science Direct, 2008, pp. 1485-1528, vol. 12, Renewable & Sustainable Engergy Reviews.

O.O. Abe et al., Effectiveness of energy wheels from transient measurements. Part I: Prediction of effectiveness and uncertainty, Science Direct, 2006, pp. 52-62, vol. 49, International Journal of Heat and Mass Transfer.

I.S. Glaznev et al., Kinetics of water adsorption/desorption under isobaric stages of adsorption heat transformers: the effect of isobar shape, Science Direct, 2009, pp. 1774-1777, vol. 52, International Journal of Heat and Mass Transfer.

Mihajlo N. Golubovic et al., Sorption properties for different types of molecular sieve and their influence on optimum dehumidification performance of desiccant wheels, Science Direct, 2006, pp. 2802-2809, vol. 49, International Journal of Heat and Mass Transfer.

Mihajlo N. Golubovic, Influence of Elevated Pressure on Sorption in Desiccant Wheels, Numerical Heat Transfer, 2004, pp. 869-886, vol. 45, Taylor & Francis Inc.

J.L.Niu et al., Heat transfer and friction coefficients in corrugated ducts confined by sinusoidal and arc curves, Pergamon, 2002, pp. 571-578, vol. 45, International Journal of Heat and Mass Transfer.

Hwataik Han et al., An Experimental Study on Air Leakage and Heat Transfer Characteristics of a Rotary-type Heat Recovery Ventilator, 2005, pp. 83-88, vol. 13, No. 2, International Journal of Air-Conditioning and Refrigeration.

Taiwan Office Action for Taiwan Application No. 100132539 dated Nov. 11, 2013.

* cited by examiner

ADSORPTION UNIT, ADSORTION DEVICE, AND METHOD FOR REGENERATING THEREOF

CROSS REFERENCE TO RELATED APPILCATIONS

This Application claims priority of Taiwan Patent Application No. 100132539, filed on Sep. 9, 2011, the entirety of which is incorporated by reference herein.

BACKGROUND OF THE INVENTION

1. Field of the Invention

The present invention relates to an adsorption unit, an adsorption device and regeneration methods thereof, and in particularly to an adsorption unit, an adsorption device and regeneration methods thereof which incorporate electrical heating to regenerate adsorptive materials therein.

2. Description of the Related Art

Common adsorptive materials are activated carbons, activated alumina, silica gels, and zeolites. Adsorptive materials are able to adsorb volatile organic compounds (VOCs) or moisture from the air. Adsorptive materials are formed with structures comprising macro-pores (with pore size greater than about 50 nm), meso-pores or micro-pores (with pore size smaller than about 2 nm), and are able to function as adsorbent with a high specific surface area, such that molecules of the VOCs or moisture can be adsorbed on a surface of adsorption materials by Van der Waals forces. Adsorption materials are typically used in an adsorption device having a multi-tower configuration or a rotary wheel configuration for performing a continuous operation.

When the adsorptive materials in the adsorption device achieves saturation, thermal convection is typically used to break the Van der Waals bonding between the adsorptive materials and the adsorbates, thereby desorbing molecules of the adsorbed VOCs or moisture from the surface of the adsorptive materials to completing the regeneration. Adsorption and desorption processes may be repeatedly applied to the adsorptive materials to provide removal of peculiar smells and dehumidification of air.

However, by thermal convection, the air needs to first be heated in regeneration method, and desorption is achieved by heat transfer between the heated air and the adsorptive materials. Due to heat loss being easily caused, in the processes for heating the air by a heater and transferring the heated air to the adsorptive materials for desorbing thereof, and heating the air with unsatisfactory heating efficiency of the heater, desorption process require great amounts of power consumption. In addition, in a size-reduced adsorption device, there is always not enough space for installing a heater with enough area for heat-exchange. As a result, additional radiation heat loss is usually caused due to an extreme high temperature of the heater surface during heating of the air.

FIG. 1 illustrates an energy consumption analysis of a conventional condensing dehumidifier for a household using a desiccant wheel as disclosed in Taiwan Patent Application Publication No. 201026374. Due to an extreme high temperature of a heater surface used therein, most of the energy consumed by the heater is dissipated in the form of radiation. In the power consumption analysis of a conventional condensing dehumidifier for a household, a condensing amount is about 6.6 liters/day (20° C., 60% RH), and a power consumption of the heater is about 600 watts, wherein 479 watts therein are for radiation heat, and only 121 watts are used for heating the air.

FIG. 2 is a method of low energy consumption for desorption as disclosed in Taiwan Patent Application Publication No. 201026374. The method couples electrode structures 31 and 32, for example reticular metal electrodes 31, on both sides of a dehumidifying material 30, and a voltage source 33 can be applied thereto by contact thereof with a brush 330, thereby causing electron excitations of the water molecules in a regeneration area, such that the water molecules obtain energy for desorbing from the adsorbents. However, the regeneration ability of method depends on the electrical conductivity between the adsorbates such as VOCs or moisture and the adsorptive materials. Since the adsorptive materials are irregular porous structures, and the generated energy may cause various regeneration issues due to various electrical conductions and heating issues during application of the electrical energy to the adsorptive materials bonded with water molecules, regeneration and desorption effects of the adsorption device are reduced. In addition, the reticular metal electrode 310 in the electrode structures 31 and 32 may block a channel for regeneration, thereby reducing effective surface area for regeneration desorption process.

BRIEF SUMMARY OF THE INVENTION

Therefore, an adsorption unit, an adsorption device and a regeneration method thereof for resolving drawbacks are needed.

An exemplary adsorption unit comprises: an electrical heating substrate defined with a fluid channel therein, and an adsorptive material layer formed on the electrical heating substrate to contact the fluid channel for adsorbing moisture or volatile organic compounds (VOCs) in a gas flowing through the fluid channel.

An exemplary adsorption device comprises: an insulating frame defined with a space therein; a plurality of adsorption units, connected and evenly disposed in the space in the insulating frame; and a plurality of contact electrode plates disposed over an outer surface of the insulating frame, wherein the plurality of contact electrode plates electrically couple to the plurality of adsorption units.

An exemplary adsorption unit comprises: providing an adsorption unit, wherein at least one adsorbate is provided on a surface of the adsorptive material layer; providing a power supply and coupling the power supply to the electrical heating substrate of the adsorption unit; and providing currents to the electrical heating substrate by the power supply, such that the electrical heating substrate generates thermal energy and the thermal energy are thermally conducted to the adsorptive material layer for heating the adsorptive material layer and desorbing the at least one adsorbate into the fluid channel.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 3:
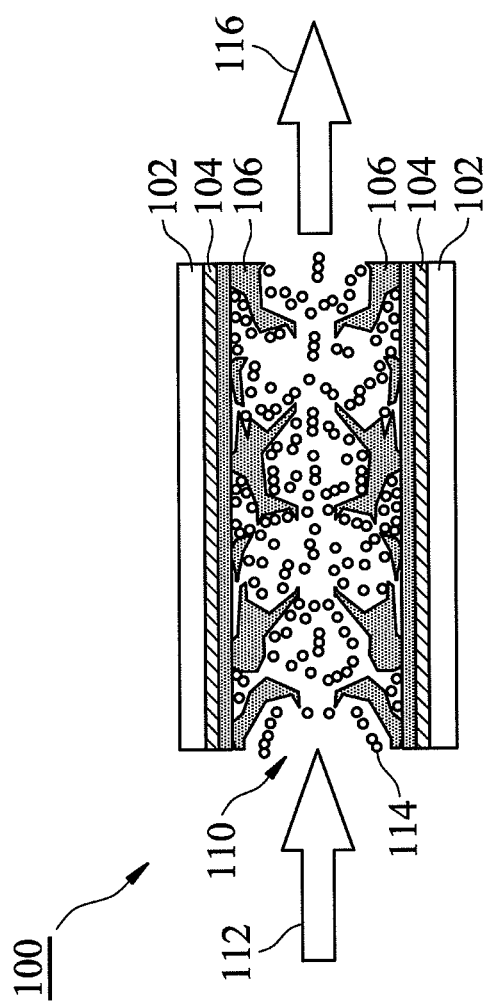
FIG. 3 shows an adsorption unit according to an embodiment of the invention.

FIG. 3 shows an exemplary adsorption unit 100, comprising an electrical heating substrate 102, a thermal conductive bonding layer 104, and an adsorptive material layer 106, wherein the thermal conductive bonding layer 104 is an optional layer and can be optionally formed dependant upon the materials used in the adsorptive material layer 106. No matter whether heat conduction is conducted by directly contacting the electrical heating substrate 102 with the adsorptive material layer 106 or contacting the electrical heating substrate 102 with the adsorption material layer 106 via the thermal conductive bonding layer 104 interposed therebetween, a thermal desorption process can be performed to the adsorptive material layer 106 through thermal conduction of thermal energy generated by the electrical heating substrate 102. In one embodiment, the electrical heating substrate 102 may comprise super conductive heating plates, positive temperature coefficient (PTC) thermistors, or other electrical heating materials such as tungsten filaments or other thermal electrical materials. The thermal conductive bonding layer 104 is optionally formed between the electrical heating material 102 and the adsorptive material layer 106, and the thermal conductive bonding layer 104 may comprise thermal conductive, thermal durable, and insulating materials such as inorganic adhesives or binder, e.g. silicon oxide and aluminum oxide, or organic adhesives or binder, e.g. poly(vinyl butyral) and poly(vinyl alcohol). In one embodiment, the adsorptive material layer 106 may comprise porous adsorptive materials such as silica gels, activated alumina, zeolites, or activated carbon. At this time, the adsorptive material layer 106 is directly formed over the electrical heating substrate 102 without formation of the interposing thermal conductive bonding layer 104, or the adsorptive material layer 106 can be adhered to an inner sidewall of the electrical heating substrate 102 by the thermal conductive bonding layer 104, thereby defining a fluid channel 110 in the electrical heating substrate 102. Fluids refer to a subset of phase of matter, which includes liquids and gases. In some embodiments, gas flow exemplifies one form of fluid.

As shown in FIG. 3, during the adsorption operation of the adsorption unit 100, gas flow 112 with volatile organic compounds (VOCs) or moisture can be introduced into the fluid channel 110 such that the VOCs or moisture in the gas flow 112 can be adsorbed by the adsorptive material layer 106. The VOCs or moisture adsorbed by the adsorptive material layer 106 are illustrated as adsorbates 114. At this time, a processed gas flow 116 can flow out from the fluid channel 110, comprising reduced humidity or reduced VOCs concentration such that the purpose for purifying the air in an ambient is thus achieved.

Figure 4:
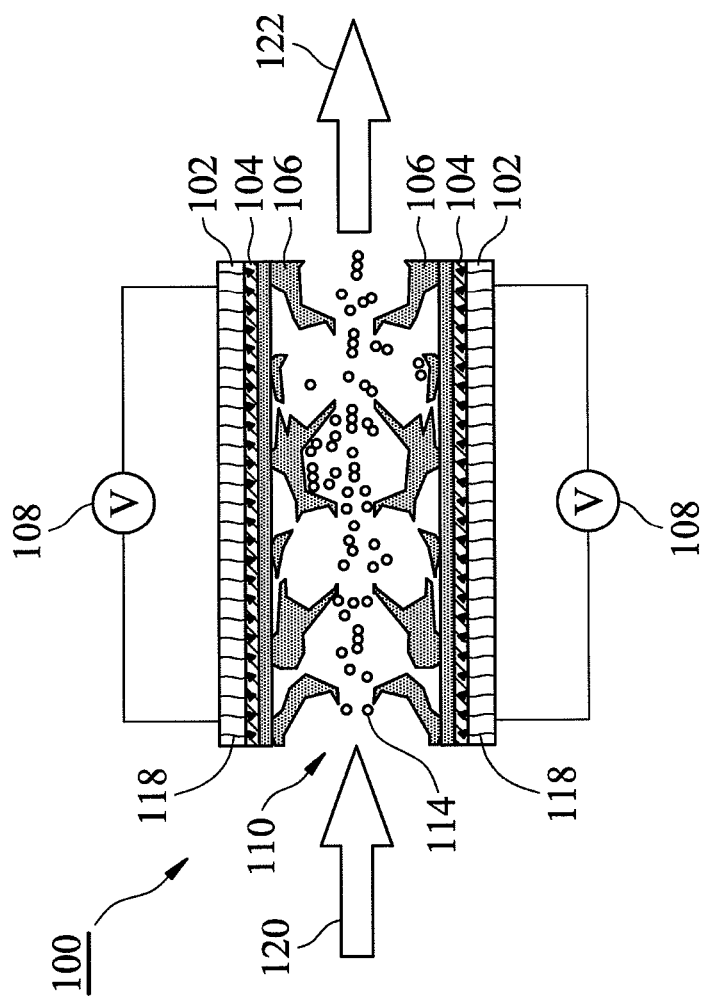
FIG. 4 shows a regeneration process of the adsorption unit shown in FIG. 3.
Figure 5A:
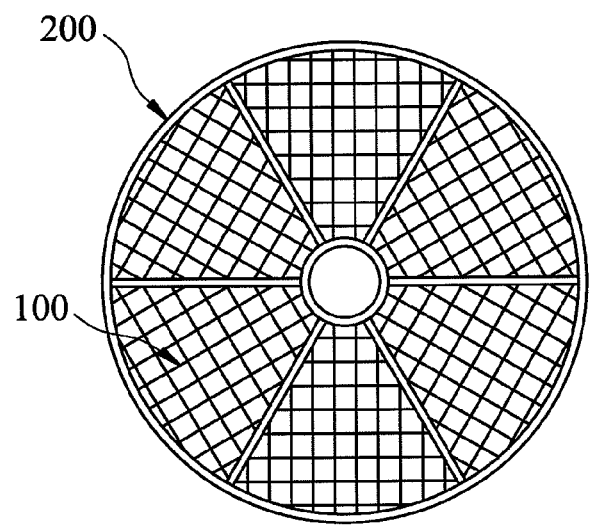
FIGS. 5a-5d are cross sections of an adsorption device according to various embodiments of the invention, respectively.
Figure 5B:
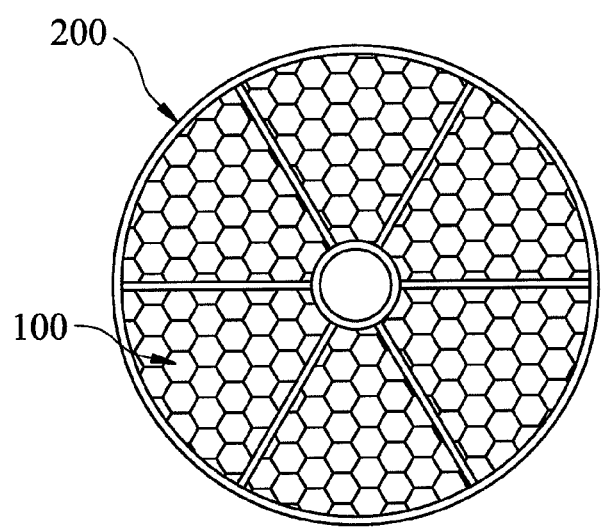
Figure 5C:
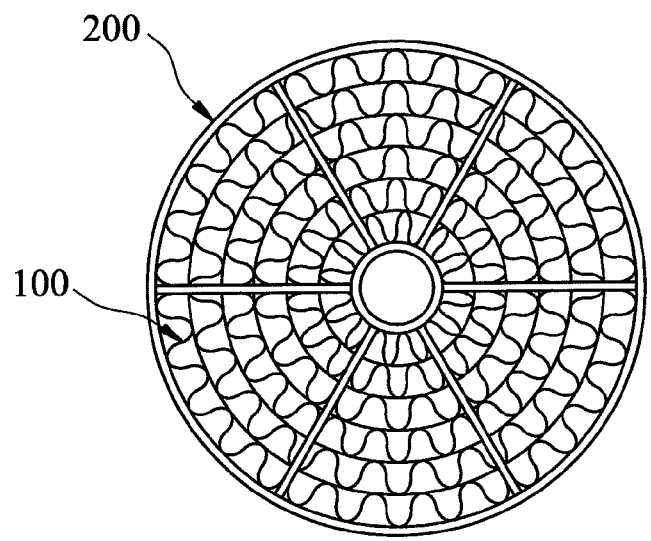
Figure 5D:
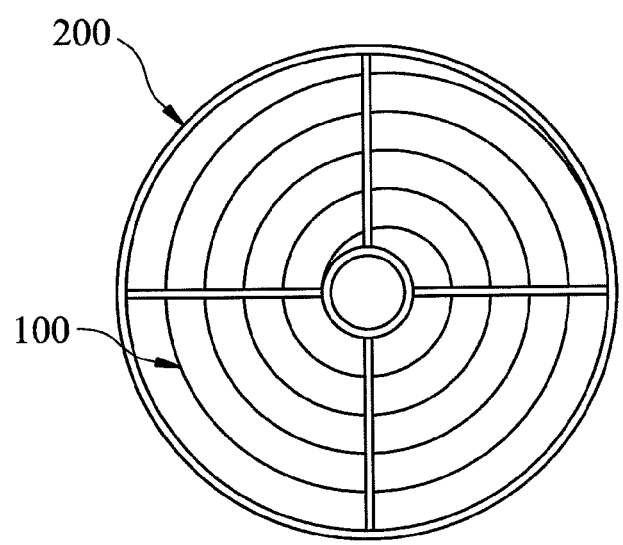

In FIG. 4, when the adsorption unit 100 is operated in the adsorption process for a period of time, the adsorptive material layer 106 may become saturated. Therefore, a desorption process is needed to regenerate the adsorption unit 100. At this time, the adsorption unit 100 is coupled with a power supply 108, for example a direct current (DC) power supply or an alternative current (AC) power supply, and the electrical heating substrate 102 may be directly or indirectly coupled with the power supply 108, and the power supply 108 may provide a predetermined voltage to directly heat the electrical heating substrate 102 and then generate thermal energy 118. The applied predetermined voltages depend on a volume of the electrical heating substrate 102. The thermal energy 118 generated by the electrical heating substrate 102 may directly propagate to the adsorptive material layer 106 or through thermal conduction of the thermal conductive bonding layer 104 to heat the adsorptive material layer 106. Thus, the adsorbates 114 over the adsorptive material layer 106 can receive the thermal energy and are then desorbed from the surface of the adsorptive material layer 106 until desorption is achieved. During the regeneration operation, another gas flow 120 such as a dry air flow can be further introduced into the fluid channel 110 to be combined with and take out the adsorbates 114 which are desorbed from the adsorptive material layer 106. Therefore, the gas 122 flowing out from the fluid channel 110 may comprise increased humidity or increased VOCs concentration, thereby completing the regeneration process of the adsorption unit 100.

During the regeneration process of the adsorption unit 100 as shown in FIG. 4, due to the thermal energy 118, generated from the electrical heating substrate 102 by the power supply 108, directly and uniformly heating the adsorptive material layer 104, heat loss in the regeneration process may thus be reduced. Heat loss may only happened by thermotic loss of materials of the electrical heating substrate 102, the thermal conductive bonding layer 104 and the adsorptive material layer 106. Thus, desorption efficiency is improved. FIGS. 5a-5d are various cross sections of an adsorption device 200 comprising the adsorption unit 100 shown in FIGS. 3-4, and various areas in the adsorption device 200 may be arranged with a plurality of adsorption units 100 which are evenly arranged, and the electrical heating unit 100 in each of the adsorption units 100 may comprise various geometric shapes such as a rectangular shape (see FIG. 5a), hexagonal shape (see FIG. 5b), corrugated shape (see FIG. 5c) or helical shape (see FIG. 5d1). It is noted that the shape of the adsorption units 100 is not limited to the shapes discussed above and can be other shapes.

Figure 6:
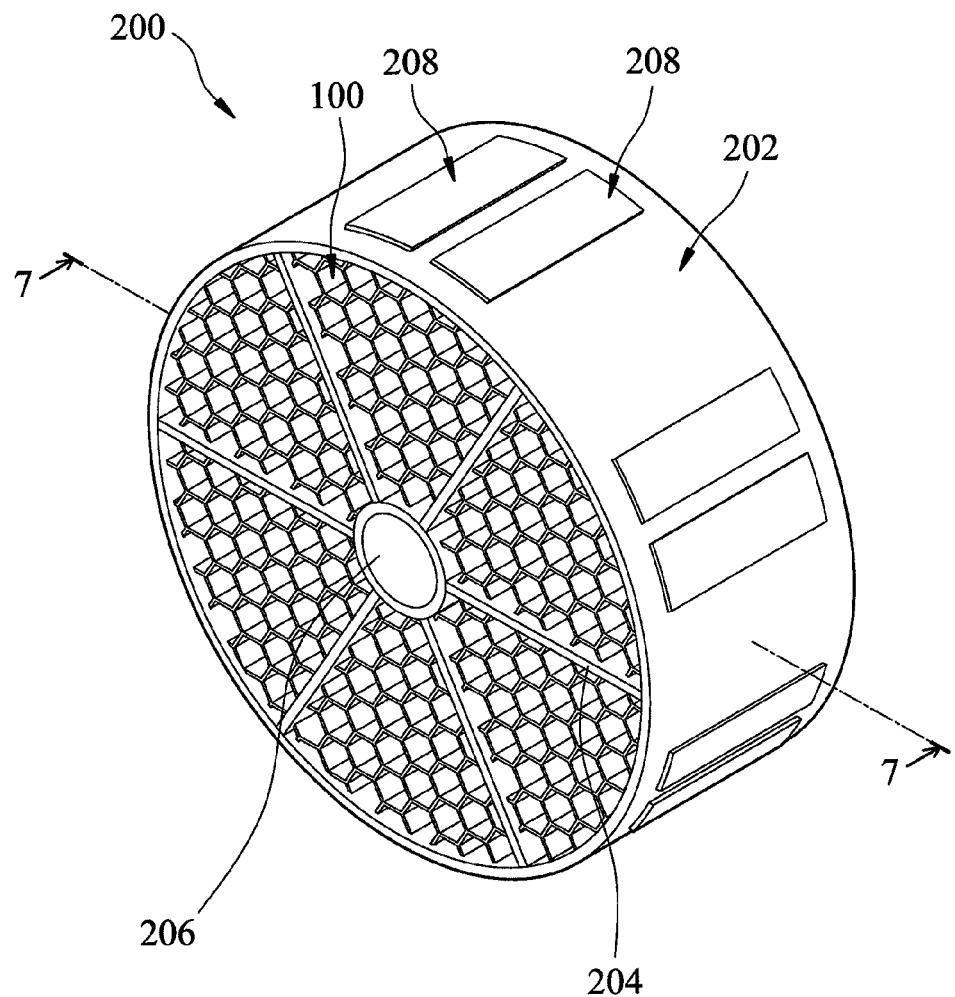
FIG. 6 shows an adsorption device according to an embodiment of the invention.

In one embodiment, the adsorption device 200 may be a wheel-like body integrated with a plurality of adsorption units 100 therein. As shown in FIG. 6, the adsorption device 200 comprises a plurality of connected and evenly arranged adsorption units 100, and these adsorption units 100 are encapsulated with an insulating frame 202 (illustrated as an insulating wheel-like body in this embodiment), and a plurality of insulating plates 204 are disposed in the adsorption device 200 to define several areas therein. These adsorption units 100 can be connected and evenly arranged in these areas. The adsorption device 200 further comprises a wheel-like body axis 206 for fixing the adsorption device 200. A plurality of contact electrode plates 208 are formed over a surface over a plurality of portions of the insulating frame 202, and the adsorption units 100 in the adsorption device 200 can thus electrically couple with an external power supply (not shown) via the contact electrode plates 208 to thereby perform a regeneration process.

Figure 7:
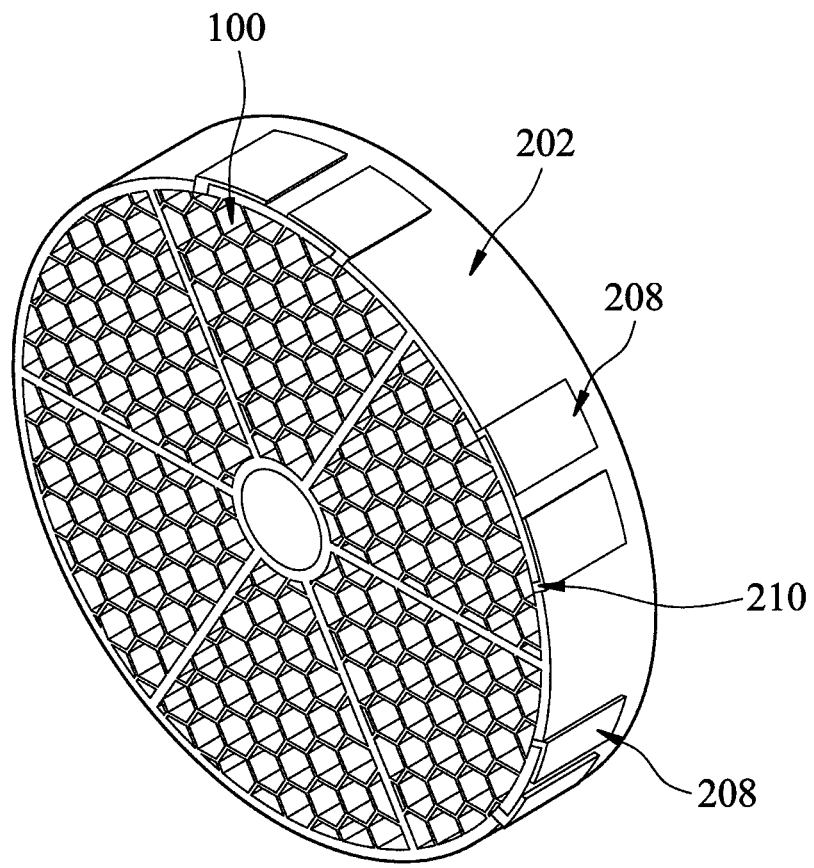
FIG. 7 shows a cross section of the adsorption device shown in FIG. 6.

In FIG. 7, a cross section taken along the line 7-7 of the adsorption device shown in FIG. 6 is illustrated. Herein, the contact electrode plates 208 and the adsorption units 100 are connected by a conductive metal plate 210 penetrating the insulating frame 202, such that currents from the external power supply may thus be sent to the adsorption units 100.

Figure 8:
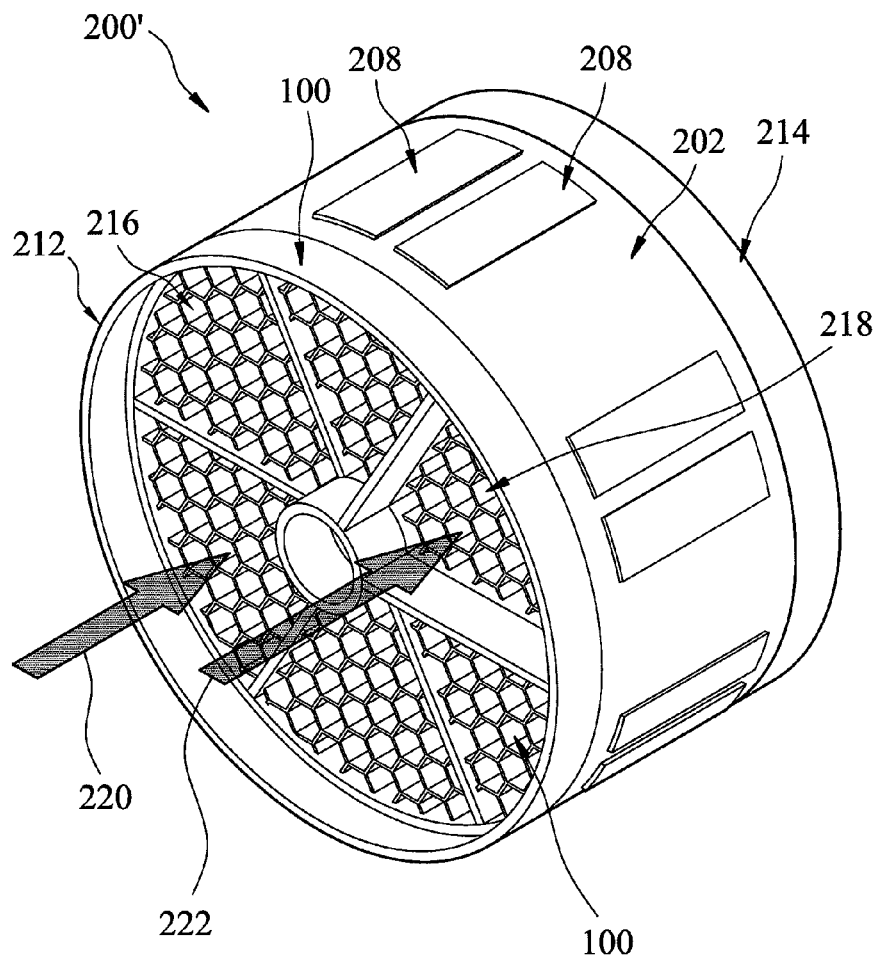
FIGS. 8-9 show an adsorption device according to various embodiments of the invention, respectively.
Figure 9:
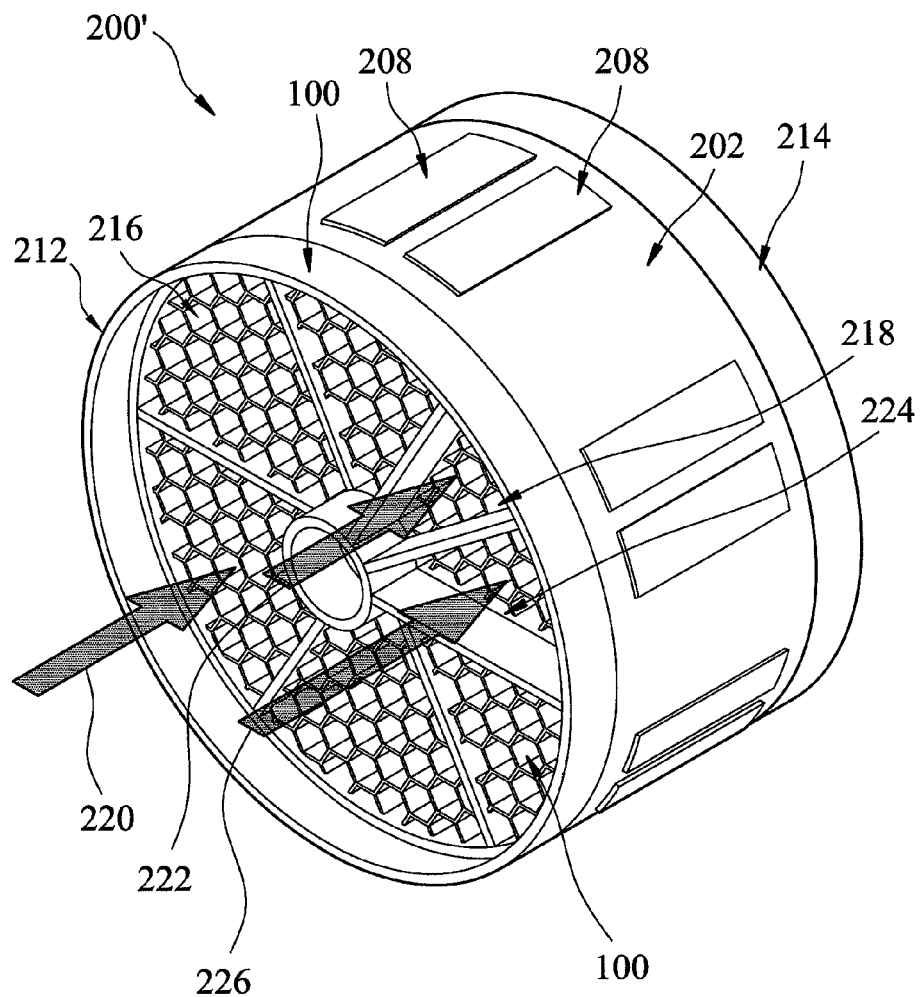

FIGS. 8-9 show an adsorption device 200' similar with the adsorption device 200 shown in FIG. 6, wherein same components herein are titled with similar numerals. In FIG. 8, the illustrated adsorption device 200' comprises similar components with the adsorption device 200 shown in FIG. 6, and further comprises the gas-inlet cap 212 disposed at the gas-inlet side and the gas-outlet cap 214 at the gas-outlet side. Herein, the gas-inlet cap 212 substantially defines an adsorption area 216 and a desorption area 218 in the adsorption device 200', and the gas flow 220 for the adsorption process can be introduced to the adsorption area 216 for proceeding the adsorption process. The gas flow 222 for desorption process can be introduced to the desorption area 218 to help the adsorbates desorb and leave the adsorption device 200'. Corresponding adsorption areas and desorption areas (not shown) to the adsorption areas 216 and desorption area 218 of the gas-inlet cap 212 are also formed in the gas-outlet cap 214, thereby introducing adsorbed and desorbed gas flow to other proper areas. Once the desorption of adsorbates need a higher desorption temperature, such as moisture having a temperature of over 180° C. or VOCs having a temperature of over 100-160° C., the structure of the adsorption device 200 illustrated in FIG. 9 can be applied. A pre-cooling area 224 may be additionally disposed adjacent to the desorption area 218 of the gas-inlet cap 212, and a pre-cooling gas flow 226 can be introduced to accelerate heat dissipation of the desorption area 218, thereby benefiting operation of sequential adsorption processes.

Figure 10:
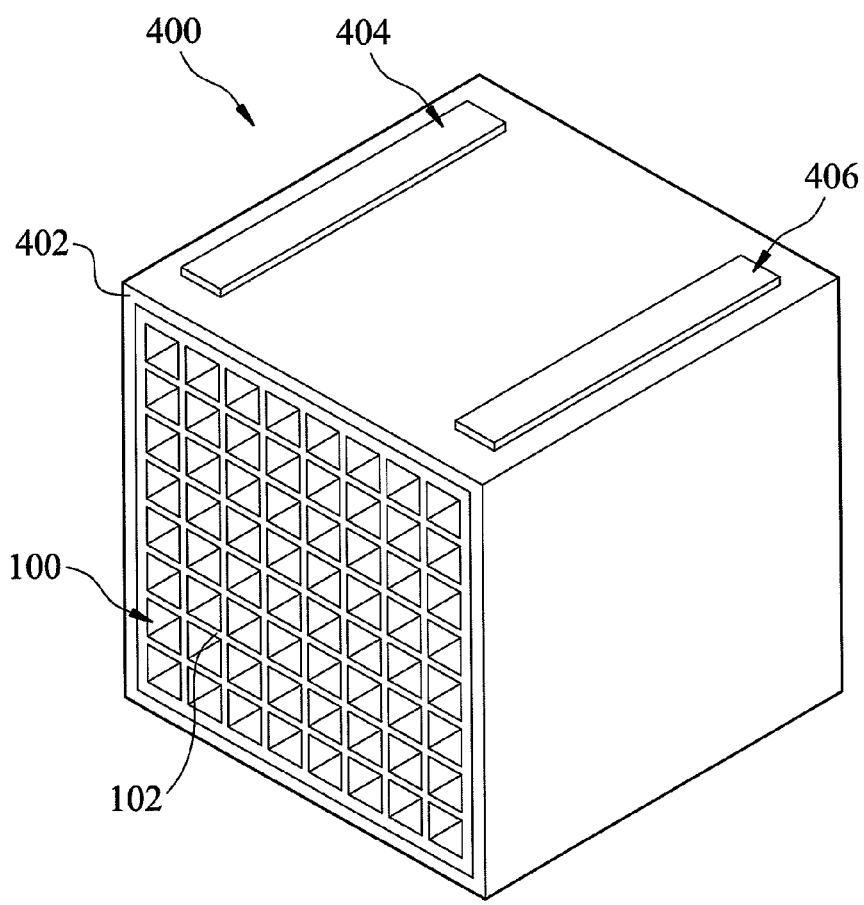
FIG. 10 shows an adsorption device according to an embodiment of the invention.

In another embodiment, the adsorption device can be a cubic-like body integrated with a plurality of adsorption units 100, such as an adsorption device 400 shown in FIG. 10. Herein, the adsorption device 400 comprises a plurality of connected and evenly arranged adsorption units 100, and the plurality of adsorption units 100 form a cubic-like structure, and an insulating frame 402 encapsulates the cubic-like structure from outside thereof to protect and insulate the cubic-like structure. A pair of contact electrode plates 404 and 406 are disposed over the insulating frame 402 to electrically couple with the adsorption units 100 and an external power supply (not shown), thereby allowing currents to be introduced to the electrical heating substrate 102 of the adsorption units 100 for directly heating thereof and for performing the desorption process. Herein, the adsorption device 400 can be applied to a single-tower type adsorption device or a twin-tower type adsorption system as shown in FIGS. 11-12, respectively.

Figure 11:
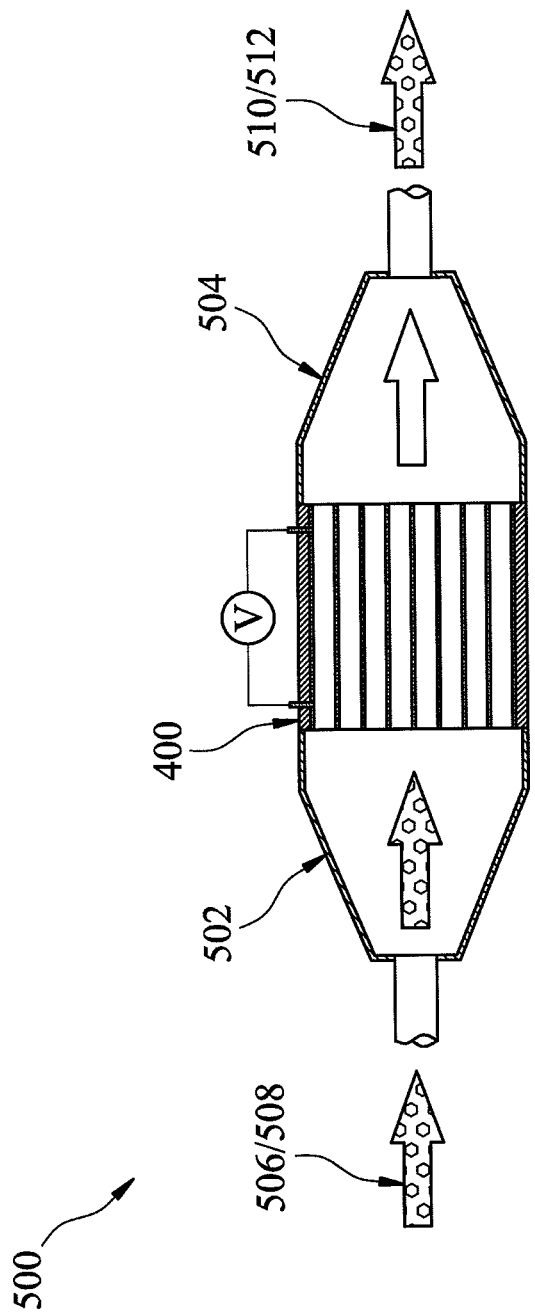
FIG. 11 shows a single-tower type adsorption device according to an embodiment of the invention.

In FIG. 11, a single-tower type adsorption device 500 integrated with the adsorption device 400 shown in FIG. 10 is illustrated. Herein the single-tower type adsorption device 500 comprises the gas-inlet cap 502, the adsorption device 400 and the gas-outlet cap 504. The inlet cap 502 is combined with the gas-inlet side of the adsorption device 400 for introducing gas flow 506 for adsorption into the single-tower type adsorption device 500 during the adsorption operation, or for introducing external gas flow 508 into the single-tower type adsorption device 500 for exhausting gas flow comprising desorbed materials out of the single-tower type adsorption device 500. The gas-outlet cap 504 is combined with the gas-outlet side of the adsorption device 400 to transfer the gas flow 510 already processed by an adsorption process or gas flow 512 comprising desorbed materials out of the single-tower type adsorption device 500 to a proper place. In this embodiment, the single-tower type adsorption device 500 may thus perform both adsorption and desorption functions.

Figure 12:
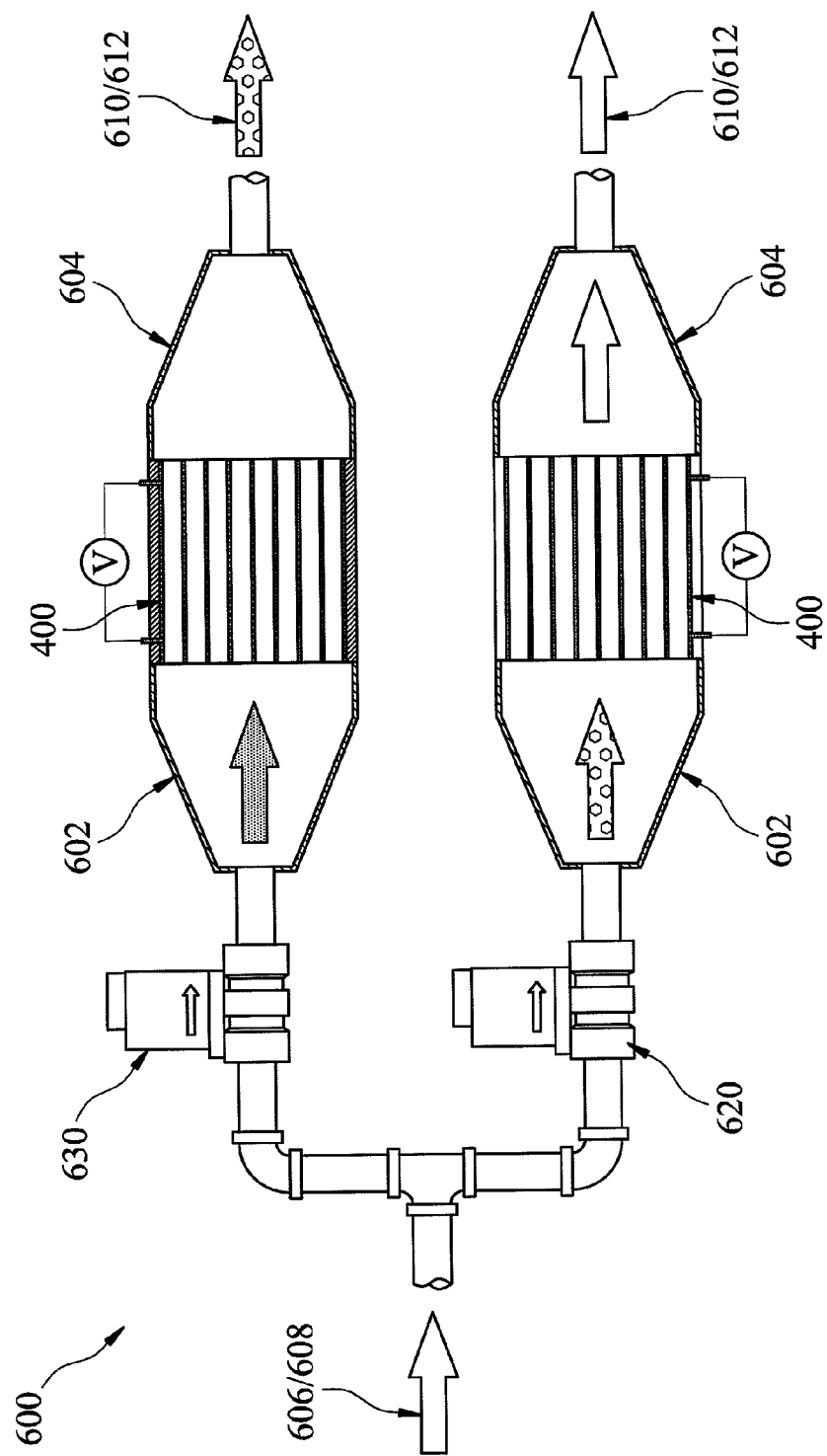
FIG. 12 shows a twin-tower type adsorption device according to an embodiment of the invention.

FIG. 12 shows a twin-tower type adsorption device 600 integrated with the adsorption device 400 shown in FIG. 10. Herein, the twin-tower type adsorption device 600 comprises two sets of the adsorption devices 400, and the gas-inlet side of the adsorption devices 400 is respectively combined with the gas-inlet cap 602 for introducing gas flow 606 for adsorption into the twin-tower type adsorption device 600 during the adsorption operation, or for introducing external gas flow 608 into the twin-tower type adsorption device 600 for exhausting gas flow comprising desorbed materials out of the twin-tower type adsorption device 600. The gas-outlet cap 604 is combined with the gas-outlet side of each of the adsorption devices 400 to transfer the already processed gas flow 610 by an adsorption process or gas flow 612 comprising desorbed materials out of the single-tower type adsorption device 600 to a proper place. In this embodiment, the twin-tower type adsorption device 600 comprises two sets of the adsorption device 400, and when one set of the adsorption device 400 performs an adsorption process, the other set of the adsorption device 400 may perform an desorption process, such that adsorption amount being processed can be increased and desorption process time can be reduced. The twin-tower type adsorption device 600 may be controlled by alternating on/off states of the inlet piping in the twin-tower type adsorption device 600 by the control valves 620 and 630.

Figure 13:
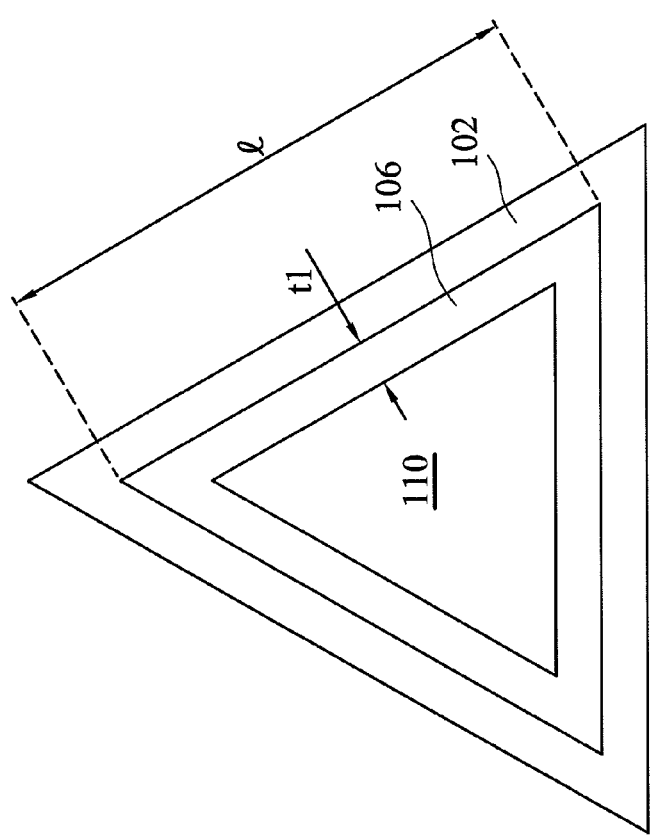
FIG. 13 shows a cross section of an adsorption unit according to an embodiment of the invention.

Embodiment:

In FIG. 13, a cross section of an exemplary adsorption unit is illustrated, comprising a triangular electrical heating substrate 102. An adsorptive material layer 106 was formed over the inner surface of the triangular electrical heating substrate 102 to thereby define a channel 110. Herein, the electrical heating substrate 102 had a thickness of about 0.05 mm, and the adsorptive material layer 106 had a thickness t1 of about 0.5 mm. The electrical heating substrate 102 had a length of about 5 mm, and the channel 110 had a length of about 20 mm. When the gas flow for regeneration (not shown) was introduced into the channel 110 of the adsorption device under conditions of 2m/s and 25° C., the thermal energy needed during a desorption process of the adsorptive material layer 106 of the adsorption device was calculated as follows:

The thermal heating substrate 102 was made of aluminum alloy, having a specific heat capacity (Cp) of about 0.21 cal/g-° C., a thermal conductive coefficient (K) of about 210-255 w/m·k, and a density of about 2.7 g/cm³. The adsorption material layer 106 was made of a molecular sieve, having a specific heat capacity of about 0.95 cal/g-° C., a thermal conductive coefficient (K) of about 0.588 w/m·k, and a density of about 2.03 g/c.c.(wet), 1.57 g/c.c. (dry).

As calculated, a coating cross section area of the molecular sieve was about $$\frac{\sqrt{3}}{4}(l^2 - (l - 2\sqrt{3}\,t_1)^2) = \frac{\sqrt{3}}{4}(5^2 - 3.268^2) = 6.22 \text{ mm}^2,$$

and a coating volume of the molecular sieve in the channel was about $$\frac{\sqrt{3}}{4}\left(l^2 - \left(l - 2\sqrt{3}\,t_1\right)^2\right) = \frac{\sqrt{3}}{4}(5^2 - 3.268^2) = 6.22 \text{ mm}^2.$$

A dry weight of the adsorptive material layer was about 1.57 g/c.c.×1.24=1.95 g. Based on the moisture adsorption capacity 10 wt % of adsorbent needed to be regenerated at the temperature 140° C., the moisture amount was about 1.95× 10%=0.195 g. The channel 110 was heated with power of 3 w for 100 seconds. Thus the energy consumption was about 3×10=300 J. The energy consumption of desorbing per gram of moisture was about $$\frac{300 \text{ J}}{0.195 \text{ g}} = 1540 \text{ J/g}.$$

Based on the above calculations, it is noted that as the desorption process is performed by direct heating, an energy consumption is 1540 J/g when the adsorption capacity of moisture is 10%, and an energy consumption is 3080 J/g when the adsorption capacity of moisture is 5%.

Figure 1:
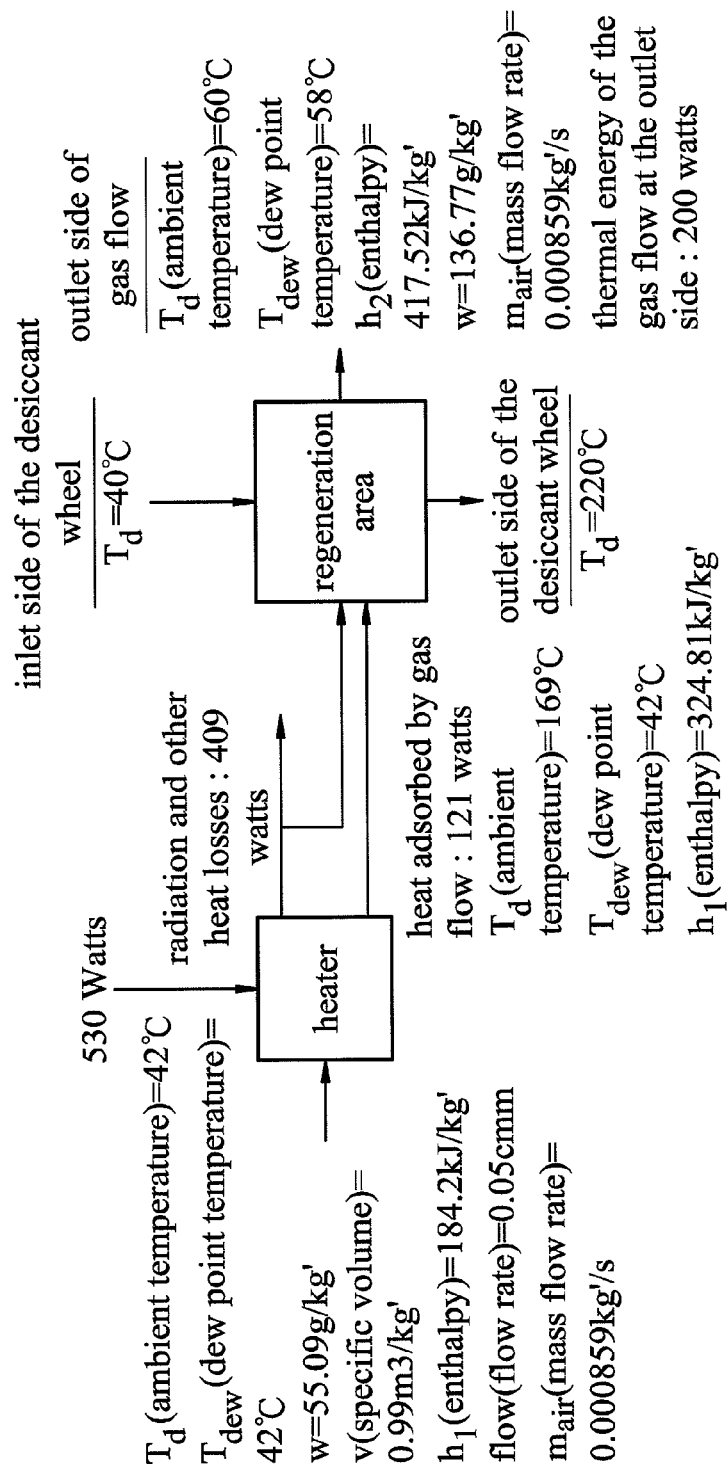
FIG. 1 is a schematic diagram showing an energy consumption analysis of a conventional condensing dehumidifier for a household using a desiccant wheel.
Figure 2:
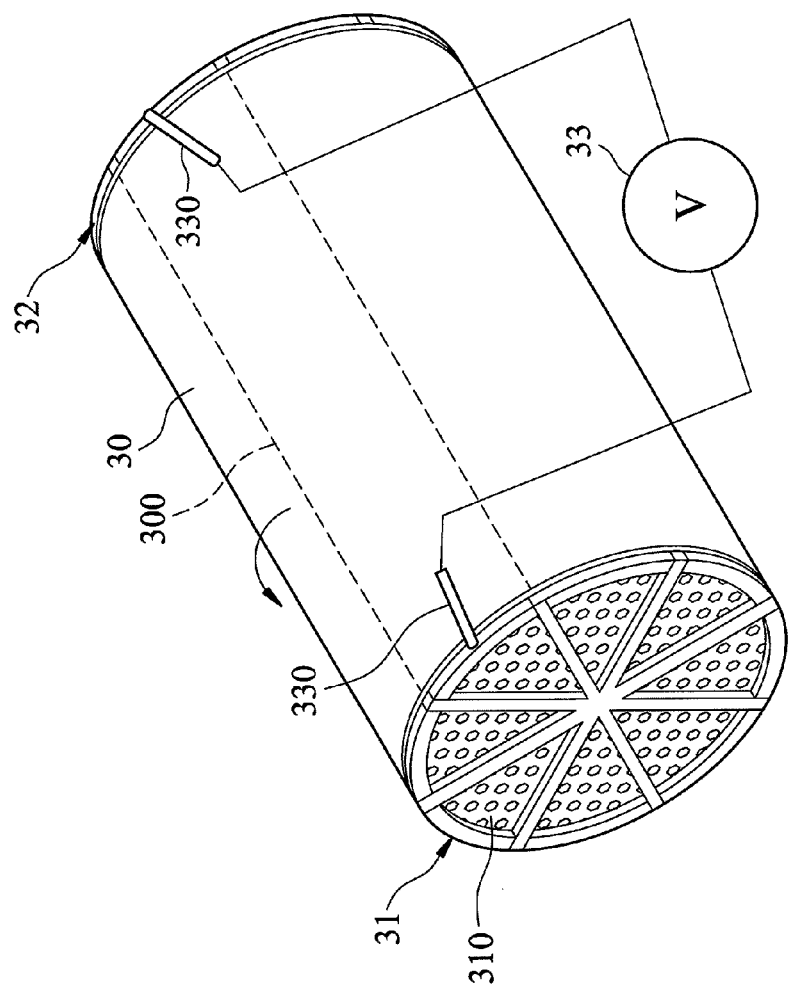
FIG. 2 is a schematic diagram showing a conventional method of low energy consumption for desorption.

Whether compared with the energy consumption analysis of the conventional condensing dehumidifier for a household using the desiccant wheel shown in FIG. 1, or compared with the energy consumption of about 4200-4700 J/g achieved by the electrical desorption method performed by the electrodes disclosed in the Taiwan Patent Publication No. 201026374, the adsorption unit in the above embodiments consumed less energy during a regeneration process thereof and the energy consumption was only about 30-70% of that disclosed in the Taiwan Patent Publication No. 201026374. Thus, the adsorption unit and the regeneration method thereof according to the invention have advantages of more reduction of energy consumption. In addition, since the adsorption unit and the adsorption device were integrated with the electrical heating substrate therein for desorption and regeneration thereof, the use of an extra heater therein is avoided. Therefore, a size reduced adsorption unit and adsorption device can be thus provided.

While the invention has been described by way of example and in terms of the preferred embodiments, it notes that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An adsorption device, comprising:
   an insulating frame defined with a space therein;
   a plurality of adsorption units, connected and evenly disposed in the space in the insulating frame, wherein each of the adsorption units comprises:
      an electrical heating substrate defined with a fluid channel therein; and
      an adsorptive material layer formed on the electrical heating substrate to contact the fluid channel for adsorbing moisture or volatile organic compounds (VOCs) in a gas flowing through the fluid channel; and
   a plurality of contact electrode plates disposed over an outer surface of the insulating frame, wherein the plurality of contact electrode plates electrically couple to the plurality of adsorption units.

2. The adsorption device as claimed in claim 1, wherein the electrical heating substrate comprises a super conducting film heating plate or a positive temperature coefficient thermistor.

3. The adsorption device as claimed in claim 1, further comprising:
   a thermal conductive bonding layer disposed between the electrical heating substrate and the adsorptive material layer, wherein the thermal conductive bonding layer comprises organic or inorganic adhesives or binder.

4. The adsorption device as claimed in claim 3, wherein the inorganic adhesives comprise silicon oxide or aluminum oxide.

5. The adsorption device as claimed in claim 3, wherein the organic adhesives comprise poly (vinyl butyral), poly (vinyl alcohol), or a combination thereof.

6. The adsorption device as claimed in claim 1, wherein the adsorptive material layer comprises porous adsorptive materials.

7. The adsorption device as claimed in claim 1, wherein the adsorptive material comprises silica gels, activated alumina, zeolites, or activated carbons.

8. The adsorption device as claimed in claim 1, wherein the insulating frame is an insulating wheel-like body, and the adsorption device further comprises:
   a plurality of insulating plates disposed in the insulating wheel-like body, thereby defining a plurality of areas therein, wherein the areas comprise the adsorption units; and
   an axis disposed at a center of the insulating wheel-like body to fix the adsorption device.

9. The adsorption device as claimed in claim 8, further comprising a conductive metal plate penetrating the insulating wheel-like body to connect the adsorption units with one of the contact electrode plates.

10. The adsorption device as claimed in claim 8, further comprising a gas-inlet cap and a gas-outlet cap disposed on opposite sides of the insulating wheel-like body, wherein the gas-inlet cap and the gas-outlet cap define an adsorption area and a desorption area in the adsorption device.

11. The adsorption device as claimed in claim 10, wherein the gas-inlet cap and the gas-outlet cap further define a pre-cooling area in the adsorption device, and the pre-cooling area is adjacent to the desorption area.

12. The adsorption device as claimed in claim 1, wherein the insulating frame is an insulating cubic-like frame, and the insulating device further comprises:
   a gas-inlet cap connected with a side of the insulating cubic-like frame; and
   a gas-outlet cap connected to another side of the insulating cubic-like frame, opposing to the gas-inlet cap.

13. The adsorption device as claimed in claim 12, wherein the adsorption device is a tower type adsorption device.

\* \* \* \* \*

UNITED STATES PATENT AND TRADEMARK OFFICE
CERTIFICATE OF CORRECTION

| | | |
|---|---|---|
| PATENT NO. | : 8,747,528 B2 | Page 1 of 1 |
| APPLICATION NO. | : 13/445670 | |
| DATED | : June 10, 2014 | |
| INVENTOR(S) | : Ming-Lang Hung et al. | |

It is certified that error appears in the above-identified patent and that said Letters Patent is hereby corrected as shown below:

On the Title Page, item (54) and in the Specification, column 1, line 1, the title of the invention should be corrected from "ADSORPTION UNIT, ADSORTION DEVICE, AND METHOD FOR REGENERATING THEREOF" to --ADSORPTION UNIT, ADSORPTION DEVICE, AND METHOD FOR REGENERATING THEREOF--

Signed and Sealed this
Twenty-first Day of October, 2014

Michelle K. Lee
*Deputy Director of the United States Patent and Trademark Office*